US007268787B2

(12) United States Patent
Hong et al.

(10) Patent No.: US 7,268,787 B2
(45) **Date of Patent: *Sep. 11, 2007**

(54) DYNAMIC ALLOCATION OF TEXTURE CACHE MEMORY

(75) Inventors: Zhou Hong, San Jose, CA (US); Chih-Hong Fu, Sunnyvale, CA (US)

(73) Assignee: S3 Graphics Co., Ltd., Grand Cayman (KY)

( * ) Notice: Subject to any disclaimer, the term of this patent is extended or adjusted under 35 U.S.C. 154(b) by 100 days.

This patent is subject to a terminal disclaimer.

(21) Appl. No.: 10/857,273

(22) Filed: May 28, 2004

(65) Prior Publication Data

US 2005/0007377 A1 Jan. 13, 2005

Related U.S. Application Data

(63) Continuation of application No. 09/399,300, filed on Sep. 17, 1999, now Pat. No. 6,750,872.

(51) Int. Cl.

| | |
|---|---|
| *G06F 12/02* | (2006.01) |
| *G06F 15/16* | (2006.01) |
| *G06F 12/00* | (2006.01) |
| *G06F 13/00* | (2006.01) |
| *G06F 13/28* | (2006.01) |
| *G06F 9/30* | (2006.01) |
| *G09G 5/39* | (2006.01) |
| *G09G 5/36* | (2006.01) |
| *G09G 5/00* | (2006.01) |
| *G11C 99/00* | (2006.01) |

(52) U.S. Cl. ...................... 345/543; 345/503; 345/531; 345/557; 345/564; 345/582; 711/1; 711/113; 711/118; 711/170; 711/172; 712/206

(58) Field of Classification Search ........ 345/543–545, 345/502, 582, 561, 506, 552–557, 581, 619, 345/660–665, 859–861, 764–766, 503, 531–533, 345/564, 572; 710/1; 711/129, 3, 113, 118, 711/170, 172, 1; 712/206

See application file for complete search history.

(56) References Cited

U.S. PATENT DOCUMENTS

| | | | | |
|---|---|---|---|---|
| 4,855,934 A | | 8/1989 | Robinson | |
| 5,461,712 A | * | 10/1995 | Chelstowski et al. | 345/543 |
| 5,651,136 A | * | 7/1997 | Denton et al. | 711/118 |

(Continued)

FOREIGN PATENT DOCUMENTS

| | | |
|---|---|---|
| WO | WO99/10813 | 3/1999 |

(Continued)

*Primary Examiner*—Ulka Chauhan
*Assistant Examiner*—Eric Woods
(74) *Attorney, Agent, or Firm*—Carr & Ferrell LLP

(57) ABSTRACT

A graphics processing system has a cache which is partitionable into two or more slots. Once partitioned, the slots are dynamically allocatable to one or more texture maps. First, number of texture maps needed to render a given scene is determined. Then, available slots of the cache are allocated to the texture maps. Sometimes, more slots are allocated to the largest texture map. At other times, more slots are allocated to the texture map which is likely to be used most often. The slots can also be allocated equally to all of the texture maps needed.

4 Claims, 8 Drawing Sheets

START
DETERMINE AVAILABLE SLOTS 111
EQUALLY ALLOCATE SLOTS 113
ALLOCATE REMAINING SLOTS 115
ASSIGN TEXTURE MAPS TO SLOTS 117
UPDATE REGISTERS 119
RETURN

U.S. PATENT DOCUMENTS 5,715,430 A * 2/1998 Hirayama .................. 711/141
5,751,292 A 5/1998 Emmot
5,790,130 A * 8/1998 Gannett ...................... 345/587
5,793,374 A * 8/1998 Guenter et al. ............ 345/426
5,809,548 A * 9/1998 Chang et al. .............. 711/166
5,828,382 A * 10/1998 Wilde ........................ 345/552
5,831,640 A 11/1998 Wang et al.
5,886,706 A 3/1999 Alcorn et al.
5,889,526 A * 3/1999 Hashimoto ................. 345/582
5,900,009 A * 5/1999 Vishlitzky et al. .......... 711/113
5,917,497 A * 6/1999 Saunders ................... 345/582
5,945,997 A * 8/1999 Zhao et al. ................ 345/581
5,963,972 A * 10/1999 Calder et al. .............. 711/129
6,002,410 A 12/1999 Battle
6,016,535 A * 1/2000 Krantz et al. .............. 711/171
6,141,725 A * 10/2000 Tucker et al. .............. 711/100
6,230,200 B1 * 5/2001 Forecast et al. ............ 709/226
6,304,268 B1 * 10/2001 Iourcha et al. .............. 345/428
6,353,438 B1 * 3/2002 Van Hook et al. .......... 345/552
6,587,113 B1 * 7/2003 Baldwin et al. ............ 345/557
6,662,173 B1 * 12/2003 Hammarlund et al. ......... 707/2
6,750,872 B1 6/2004 Hong et al.
7,050,063 B1 * 5/2006 Mantor et al. .............. 345/582

FOREIGN PATENT DOCUMENTS

WO WO99/53402 10/1999

* cited by examiner

DYNAMIC ALLOCATION OF TEXTURE CACHE MEMORY

CROSS-REFERENCE TO RELATED APPLICATION

The present application is a continuation of and claims the priority benefit of U.S. patent application Ser. No. 09/399,300 entitled "Dynamic Allocation of Texture Cache Memory" filed Sep. 17, 1999 now U.S. Pat. No. 6,750,872. The disclosure of this commonly owned and assigned application is incorporated herein by reference.

BACKGROUND OF THE INVENTION

The present invention relates generally to caches, and more particularly to allocation of texture data to a cache in a graphics processing system.

Graphics processing systems generate graphics for display on video monitors and the like. The graphics are often extremely detailed, and provide realistic views of three dimensional images on two dimensional displays. A variety of techniques are utilized to increase the realism of displays. For example, graphics processing systems often determine what objects should be displayed based on a supposed eye point of an observer, as well as the relative sizes of the objects. In addition, one technique widely used to increase realism of a display is the use of textures. Textures indicate surface qualities of an object. The surface qualities may be variations in color, as well as variations in the physical surface of the object.

Textures are often stored in the form of texture maps which are often defined with respect to a surface. More specifically, texture maps are often defined with respect to types of surfaces, as well as the level of detail of the surfaces. In addition, much as a surface of a video screen is comprised of pixels, texture maps are comprised of texture elements, or texels. As the number of surfaces displayed during the course of execution of an application are often very large, and details of the surfaces complex, the size of the texture maps, and therefore the number of texels, may be large.

Texels are used in conjunction with geometric information of an object to determine color and intensity of a pixel displayed on a display device. Often multiple texels from a single texture map are used, or blended, to determine the display characteristics of a pixel. In addition, at times texels from more than one texture map are used to determine the display characteristics of any one pixel. Therefore, color and intensity of a single pixel may be formed through blending multiple texels, and these texels may come from more than one texture map.

Graphics processing systems, therefore, require access to large numbers of texels to form realistic displays. This data is generally stored within a computer system memory. Accessing computer system memory, however, is often a relatively lengthy process and may produce delays which could degrade the realism of generated displays.

A graphics cache dedicated to storing graphics data is sometimes used to enhance accessibility of graphics data by a graphics processing system. The graphics cache is provided graphics data from the system memory prior to a demand by the graphics processing system. The graphics system, therefore, has graphics data available for use when desired, thereby reducing the need to promptly access system memory and reducing problems associated with memory latency.

Preferably, data for use by the graphics processing system is available for use by the graphics processing system when needed. This maximizes cache usage and reduces cache swapping and texture map fetching, thereby increasing graphics processing system performance. Texture maps are often quite large, however, and without sufficient care in providing texture map data to the graphics cache, less than optimum usage of the graphics cache may result. Moreover, during operation of the graphics processing system demands for various texture maps may dynamically vary.

SUMMARY OF THE INVENTION

The present invention therefore provides dynamic allocation of texture map memory. In one embodiment, the present invention comprises a graphics processing system. A graphics processing system includes a cache adapted to receive data from a system memory. The cache is partitioned into a plurality of slots. The graphics processing system additionally includes a register containing information regarding data provided to the slots. In a further embodiment the cache comprises a plurality of cache lines and the slots are comprised of a plurality of cache lines. Further, the data stored in the cache comprises texture maps, with a maximum of one texture map stored in any one slot.

In another embodiment, the present invention comprises a method of performing graphics processing. The method includes partitioning a cache into a plurality of slots, and dynamically allocating the plurality of slots. The register is updated with slot allocation status. In another embodiment the slots are allocated after determining the number of texture maps needed to render a scene. In another embodiment slots are divided equally among texture maps. In yet another embodiment in a graphics processing system having a cache memory used for storage of texture data, the invention comprises a method of dynamically allocating cache memory. The method includes partitioning the cache into a plurality of slots and determining the number of texture blocks to be rendered. The plurality of slots are allocated among the texture blocks.

Many of the attendant features of this invention will be more readily appreciated as the same becomes better understood by reference to the following detailed description considered in connection with the accompanying drawings.

DETAILED DESCRIPTION

Figure 1:
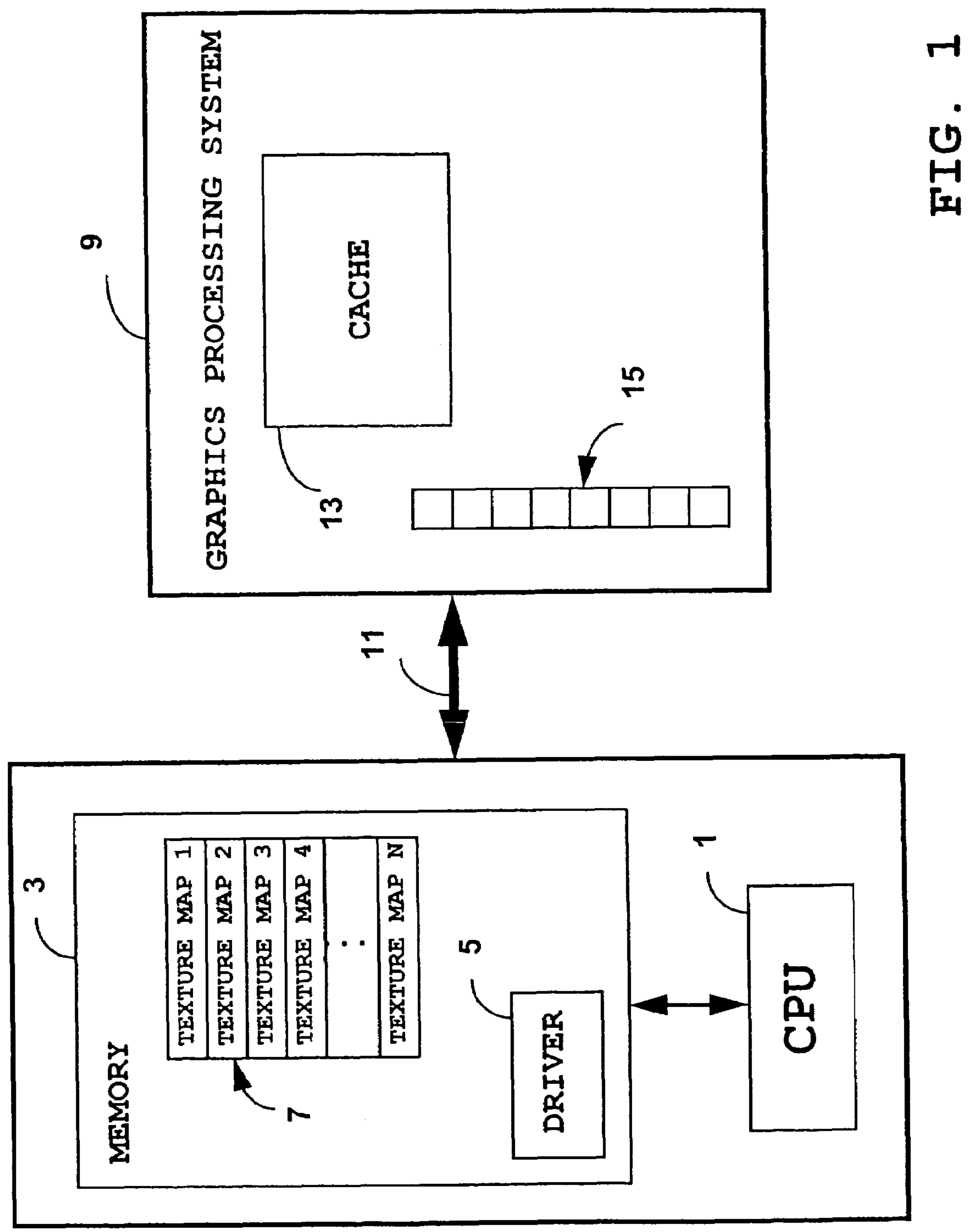
FIG. 1 is a system block diagram of a computer system having a graphics processing system including a cache.

FIG. 1 illustrates a simplified block diagram of a computer system. The computer system includes a CPU 1, a system memory 3 and a graphics processing system 9. The CPU performs various functions, including executing programs resident in the system memory. The system memory, therefore, stores executable programs as well as data used by those programs. The executable programs include a graphics driver 5, and the data includes information used in the generation of graphical displays. This information includes a number of texture maps 7. The texture maps contain texture information for geometric objects. As those of skill in the art will understand, the term texture map as used herein includes a texture map and its associated mip-maps. The texture information is stored as individual texture elements (texels). The texels are used during graphics processing to define color data displayed at pixel coordinates. In addition, multiple texture maps may be used in rendering any given scene.

The graphics driver receives display requests from applications also executing on the CPU. The applications include executable programs which have associated data, including texture maps, for generation of realistic graphical displays. The graphics driver processes the requests and provides commands and associated information to the graphics processing system. The data and commands are provided to the graphics processing system over a system interface 11.

The graphics processing system includes a cache 13. The cache stores information associated with the commands, i.e., information used in the generation of graphical displays by the graphics processing system. More specifically, in the embodiment described the cache stores portions of texture maps resident in the system memory 3.

The size of each texture map is generally greater than the size of the cache. Thus, the cache is unable to contain an entire texture map at any given moment in time. Accordingly, the graphics driver, in conjunction with processes executing on the graphics processing system, provides portions of the texture map to the cache as appropriate. Registers 15 in the graphics processing system maintain information regarding the texture maps provided to the cache.

Figure 2:
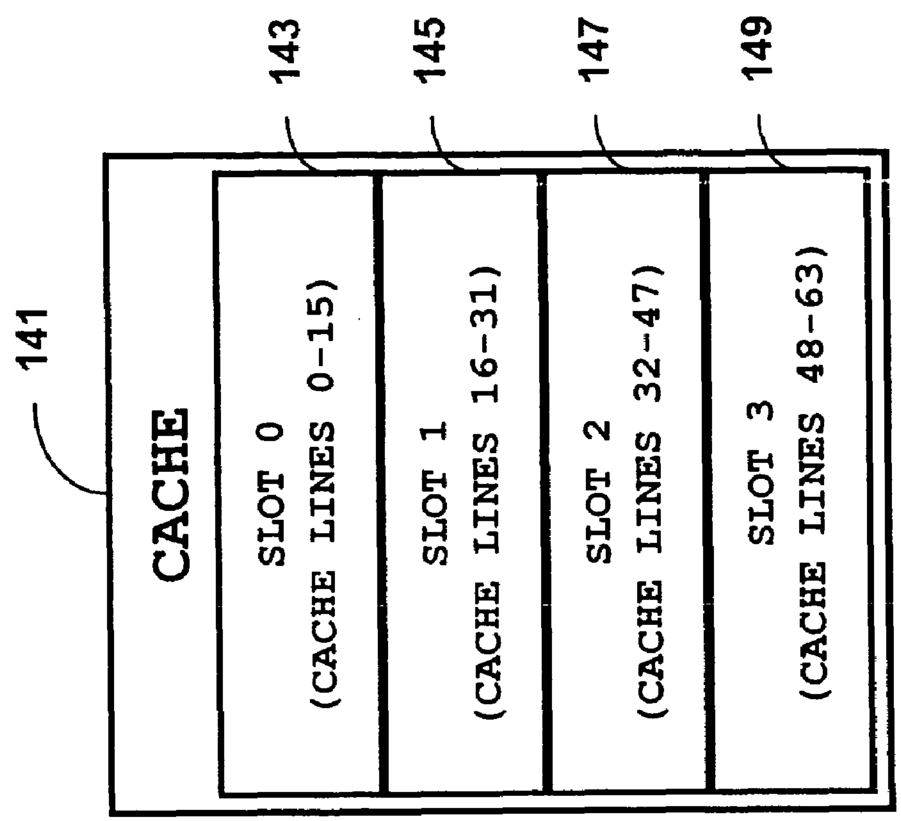
FIG. 2 illustrates a cache configuration in which the cache is partitioned into slots.

An embodiment of the cache of FIG. 1 is shown in FIG. 2. As illustrated in FIG. 2, the cache comprises 64 cache lines. Each of the cache lines stores information for texels, and each cache line is 1024 bits in the embodiment described. The number of texels for which information is stored is therefore dependent on the number of bits used per texel. Texels are described by 16 bits in the embodiment described, and each cache line therefore contains information for 64 texels. In other embodiments the number of bits per texel varies. For example, four bits per texel are used in one embodiment, and in still another embodiment the number of bits per texel varies dynamically according to the level of detail for each texture map.

The cache is logically partitioned into slots, and cache lines are assigned to the slots. As illustrated in FIG. 2 the cache includes four slots. The four slots are a Slot 0 143, a Slot 1 145, a Slot 2 147 and a Slot 3 149. Cache lines 0-15 are assigned to Slot 0, cache lines 16-31 are assigned to Slot 1, cache lines 32-47 are assigned to Slot 2, and cache lines 48-63 are assigned to Slot 3. Each of the slots, therefore, contains 16 cache lines.

Figure 3:
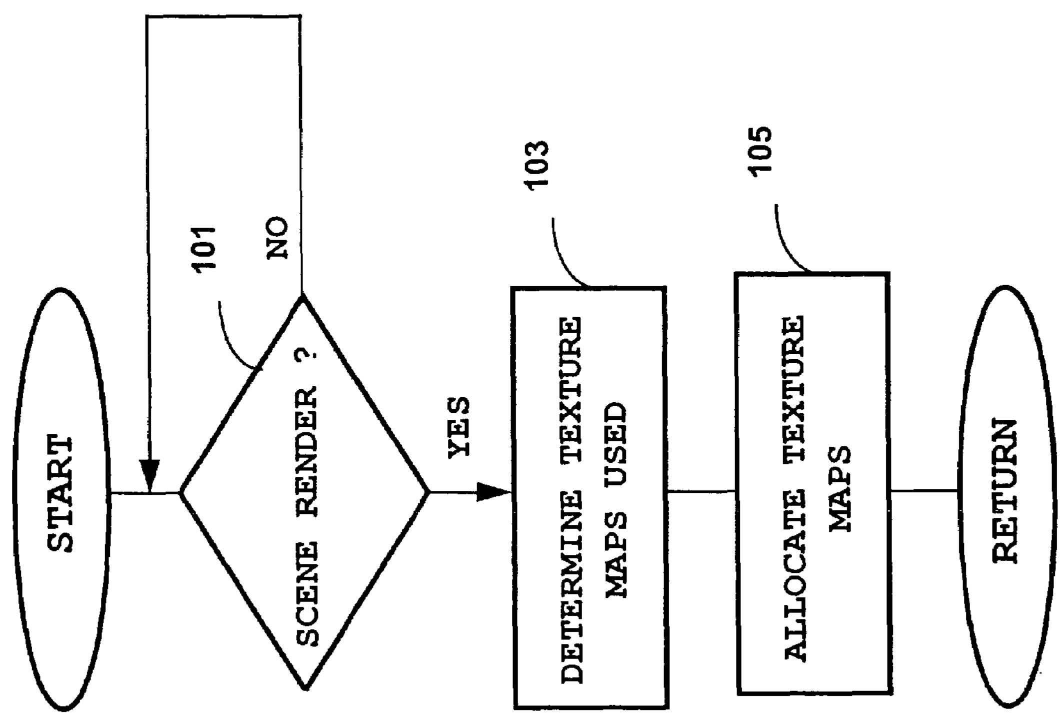
FIG. 3 is a flow diagram of a process for allocating slots of the cache of FIG. 2 to texture maps.

FIG. 3 illustrates a process for allocating slots of the cache to texture maps. This process is executed by the graphics driver 5 (shown in FIG. 1). The process allocates a slot to a maximum of one texture map, and a slot therefore forms a minimum cache size available for allocation. Accordingly, with respect to the cache described in conjunction with FIGS. 1 and 2, in alternative embodiments the number of slots by which the cache is partitioned varies.

In step 101 of the process of FIG. 3, the process determines if the graphics processing system are to render a scene. Rendering a scene involves converting primitives of an image to pixel values in a pixel map. Rendering a scene may include rendering a scene which encompasses an entire display, as well as rendering scenes covering only a portion of a display. In step 103 the process determines the texture maps to be used in rendering the scene. The process determines the texture maps to be used in two ways. An application knows a number of texture maps available and which ones to use in rendering the scene. The application generally instructs the graphics driver to use new texture maps when needed. When instructions to use new texture maps are not given, the graphics driver uses the texture maps it has previously been instructed to use by the application. Some scenes may utilize only a single texture map. Other scenes may utilize two or potentially more texture maps. In step 105 the process allocates slots of the cache to texture maps.

Figure 4:
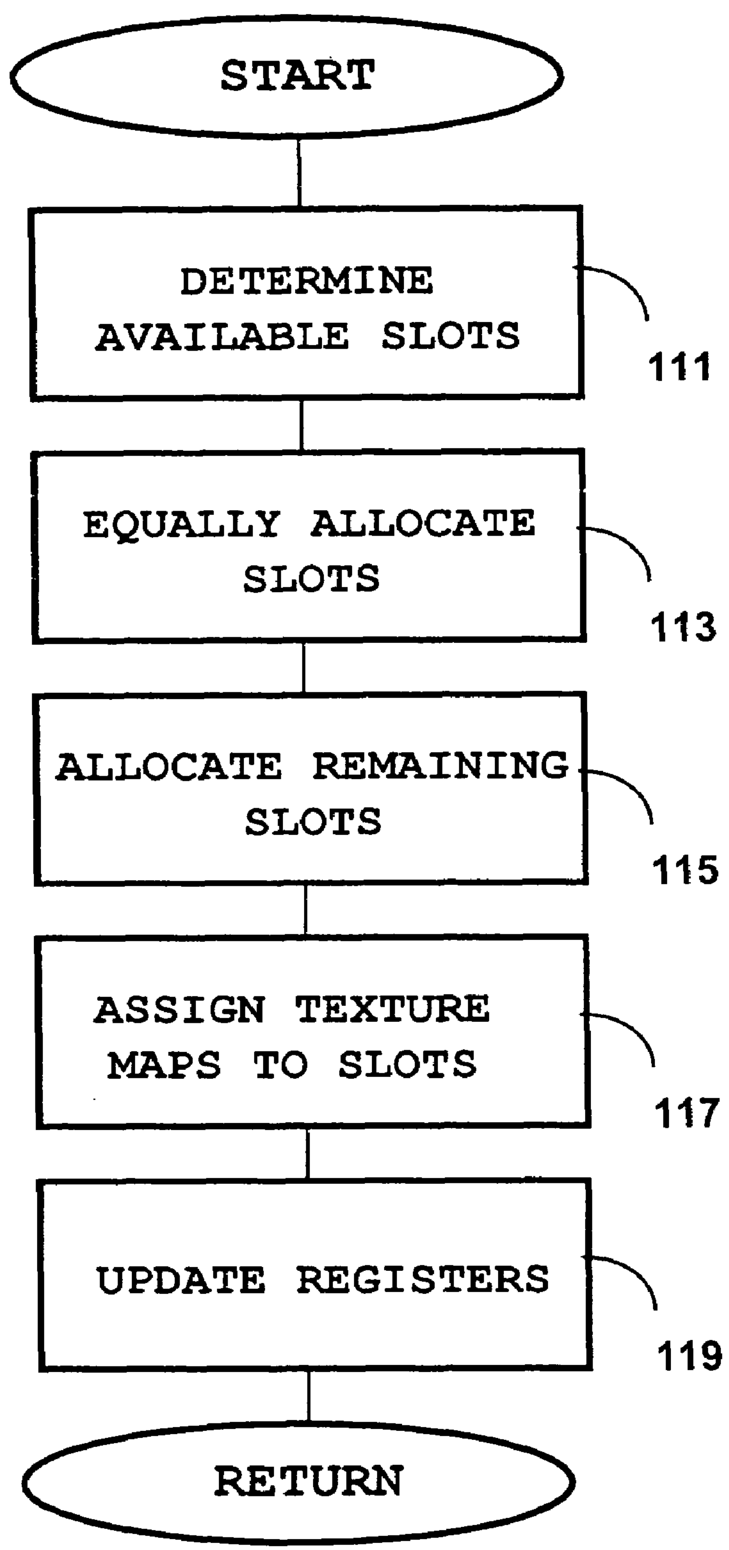
FIG. 4 is a flow diagram of a subprocess of the process of FIG. 3.

FIG. 4 illustrates additional details of the step of allocating texture maps to slots. In step 111 the process determines the available number of slots. In the embodiment described the number of slots is fixed at four. In another embodiment the number of slots is configured at the beginning of graphics processing, and remains constant throughout the graphics processing. In yet another embodiment the number of slots is dynamically varied from a minimum of one to a maximum of a number of cache lines in the cache.

In step 113 the process determines how many slots may be allocated to each texture map such that each texture map is allocated an equal number of slots. For example, if there are four available slots and two texture maps are to be used, two slots are allocated to each texture map. Similarly, if there are four available slots and four texture maps are to be used to render the scene, one slot is allocated to each texture map. If, however, there are four available slots and three texture maps are to be used in rendering the scene, then one slot is allocated to each texture map. Any remaining slots after an equal distribution among texture maps is allocated by the process in step 115. Details of step 115 are discussed further below.

In step 115 the process assigns texture maps to slots. In one embodiment, texture maps are assigned to slots in a round robin basis. In another embodiment, texture maps are assigned to slots such that a single texture map is assigned to contiguous slots. In yet another embodiment, texture maps are assigned to slots on the basis of texture map size.

In step 119 the process provides information for updating registers of the graphics processing system. The registers contain information as to which texture maps are mapped to which slots. This allows the graphics processing system to determine which slots to find appropriate data during processing of texture information.

Figure 5:
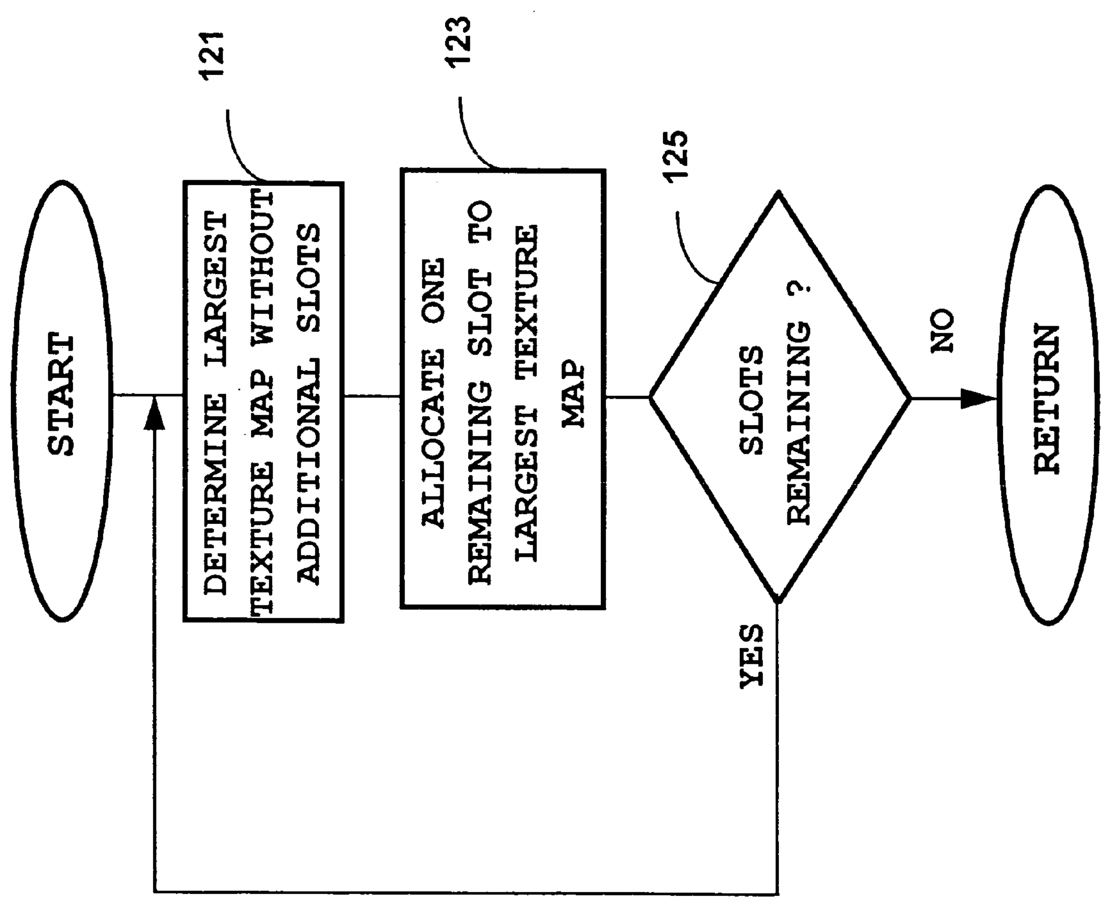
FIG. 5 is a flow diagram of a process for allocating remaining slots.

FIG. 5 illustrates a process for allocating the remaining slots. The process is executed by the graphics driver. In step 121 the process determines the largest texture map which has not already been provided with additional slots. Information regarding texture map sizes is available to the graphics driver. In step 123 the process allocates a remaining slot to the texture map determined immediately prior in step 121. Thus, if three texture maps are being allocated to four slots, the largest texture map of the three texture maps will be allocated one additional slot.

In step 125 the process determines if any slots remain to be allocated. If no further slots remain to be allocated the process returns. Otherwise, the process goes to step 121, and repeats until all unallocated slots have been allocated.

Figure 6:
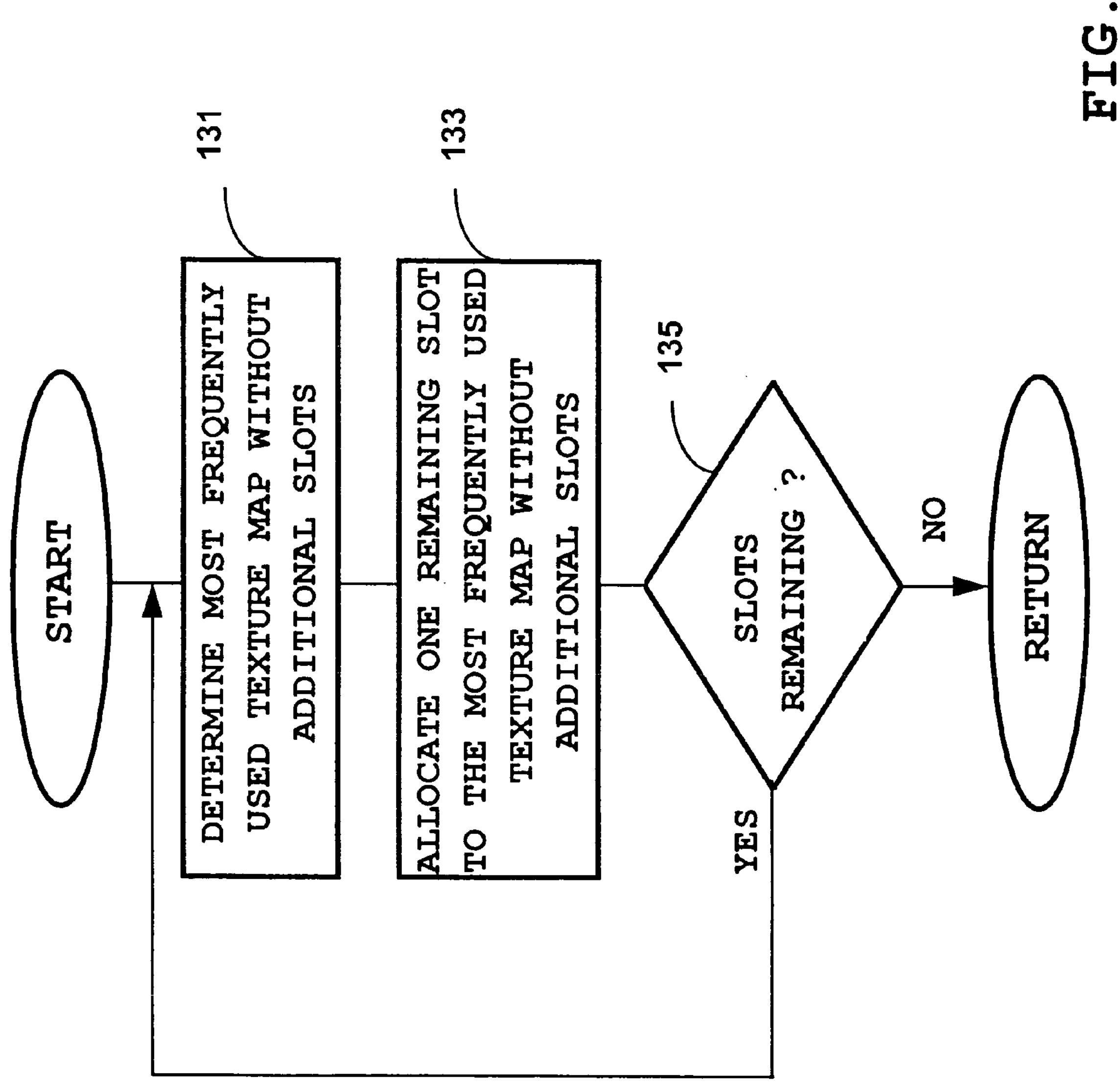
FIG. 6 is a flow diagram of an alternative process for allocating remaining slots.

FIG. 6 illustrates an alternate process for allocating the remaining slots. The process is executed by the graphics driver. In step 131 the process determines the texture map that is likely to be used most frequently which has not already been provided with additional slots. In step 133 the process allocates one remaining slot to the texture map determined immediately prior in step 131. Thus, if four slots are being allocated among three texture maps, one additional slot is allocated to the texture map that is likely to be used most frequently of the three texture maps.

In step 135 the process determines if any slots remain to be allocated. If no further slots remain to be allocated the process returns. Otherwise, the process returns to step 131 and determines the texture map that is likely to be used most frequently which has not already been assigned an additional slot. The process thereafter repeats until all unallocated slots have been allocated.

Figure 7:
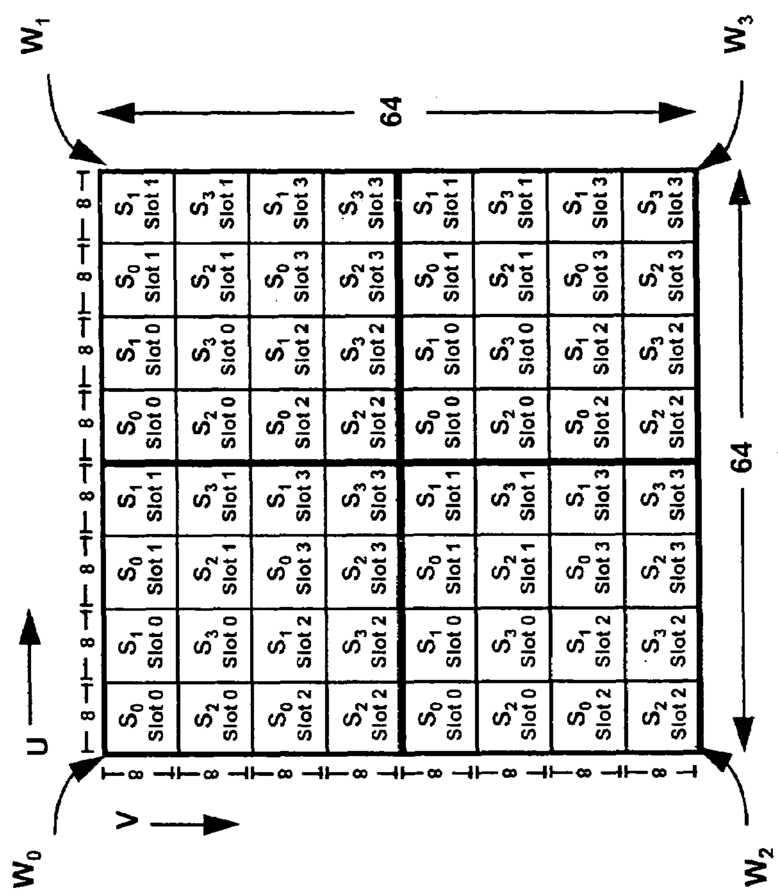
FIG. 7 illustrates further details of the cache of FIG. 2.

FIG. 7 illustrates further details of the cache of FIG. 2, including details of how texture map data is stored in the cache. Additional details regarding an embodiment of the cache, and details of use of the cache may be found in the patent application entitled Synchronized Two-Level Graphics Processing Cache, filed of even date herewith and which is assigned to the assignee of the present application, and the disclosure of which is incorporated by reference as if fully set forth herein. FIG. 7 illustrates the 64 cache lines of the cache arranged in a square having horizontal and vertical edges. The actual physical arrangement of the cache lines may not be square, and indeed is unlikely to be so arranged, but the use of a square for descriptive purposes is useful in understanding the arrangement of data in the cache. Generally speaking, the cache contains data for a portion of a texture map, with a horizontal axis of the cache corresponding to the U direction, and a vertical axis of the cache corresponding to the V direction.

Each of the four slots, Slot 0, Slot 1, Slot 2 and Slot 3 of the L2 cache includes four sets $S_0$, $S_1$, $S_2$ and $S_3$. Thus, the cache lines in Slot 0 is subdivided into four sets $S_0$, $S_1$, $S_2$ and $S_3$, and the cache lines of each of the other slots are also so divided. Diagrammatically, therefore, the square illustrated in FIG. 7 is divided into four quadrants. Each quadrant is divided into 16 small squares. Each small square represents a cache line. In each quadrant, four upper left small squares represent cache lines belonging to each of the four sets $S_0$, $S_1$, $S_2$ and $S_3$ of Slot 0, respectively. Similarly four upper right small squares represent cache lines of Slot 1, four lower left small squares represent cache lines of Slot 2, and four lower right small squares represent cache lines of Slot 3. The four cache lines in each slot of each quadrant is arranged so that $S_0$ is at an upper left corner, $S_1$ is at an upper right corner, $S_2$ is at a lower left corner and $S_3$ is at a lower right corner. Therefore, the cache lines are organized in such a way that each of any four adjacent cache lines belongs to a different set. When a texture map portion is transferred to the cache, it is loaded into the set of the slot to which it has been mapped based on mapping information contained in the registers.

Thus, when a texture map is mapped to a slot of the cache, each cache-line sized texture map portion is mapped to a set of the slot and not to a particular cache line. Therefore, each cache-line sized texture map portion can be loaded into any of the four cache lines belonging to the set of the slot to which the texture map portion has been mapped. For example, if a texture map portion is mapped to set $S_0$ of Slot 0, the texture map portion may be stored in any of the four cache lines belonging to set $S_0$ of Slot 0.

Since the cache is loaded on a cache line basis when texture data is transferred into the cache, it is possible for two adjacent cache lines to contain two non-contiguous portions of the texture map in UV space where the two non-contiguous texture map portions are mapped to two adjacent sets of the cache. For example, suppose a first cache line-sized portion of a texture map has been mapped to set $S_0$ of Slot 0 and a second cache line-sized portion of the texture map has been mapped to set S1 of Slot 0, where the first cache line-size portion is not contiguous to the second cache line-sized portion in UV space. When the first and second cache line-sized portions are loaded into the cache, they can be loaded into two adjacent cache lines, one belonging to set $S_0$ and the other belonging to set $S_1$.

A corollary is that two cache line-sized portions of a texture map, contiguous to each other in UV space, do not necessarily occupy two adjacent cache lines when loaded into the cache. For example, suppose a first and second cache line-sized portions of a texture map are mapped to set $S_0$ of Slot 0 and set $S_1$ of Slot 0, respectively. Suppose the first cache line-sized portion is loaded into one of four cache lines belonging to set $S_0$ of Slot 0. When the second cache line-sized portion is loaded into the cache, it can be loaded into any of four cache lines belonging to set $S_1$ of Slot 0, only one of which is adjacent to the cache line to which the first cache line-sized portion was loaded.

Therefore, for example, suppose four adjacent cache line-sized portions of a texture map, each containing an adjacent texel, have been mapped to four different sets of a slot in the cache. When the slot of the cache is searched for the four adjacent cache line-sized portions, they may be found in cache lines that are non-adjacent to each other. In addition, some of the cache line-sized portions may be found in the cache while others are not. In other words, since the cache is loaded on a cache line basis, some cache line-sized portions may have been loaded into the cache while others are not. In these cases where some cache line-sized portions are found in the cache and others are not, the cache line-sized portions that are not found in the cache are loaded into the cache.

As illustrated in FIG. 7, increasing distance from the upper left hand corner of the cache results in increasing UV values. This is merely to illustrate the repetitive nature of mapping of cache line sized contiguous portions of UV space to sets and slots of the cache. Moreover, as illustrated, the mapping applies as if all four slots are allocated to a single texture map. If all four slots are allocated to different texture maps, for example, cache line sized portions of UV space would only be repetitive as to sets.

Figure 8:
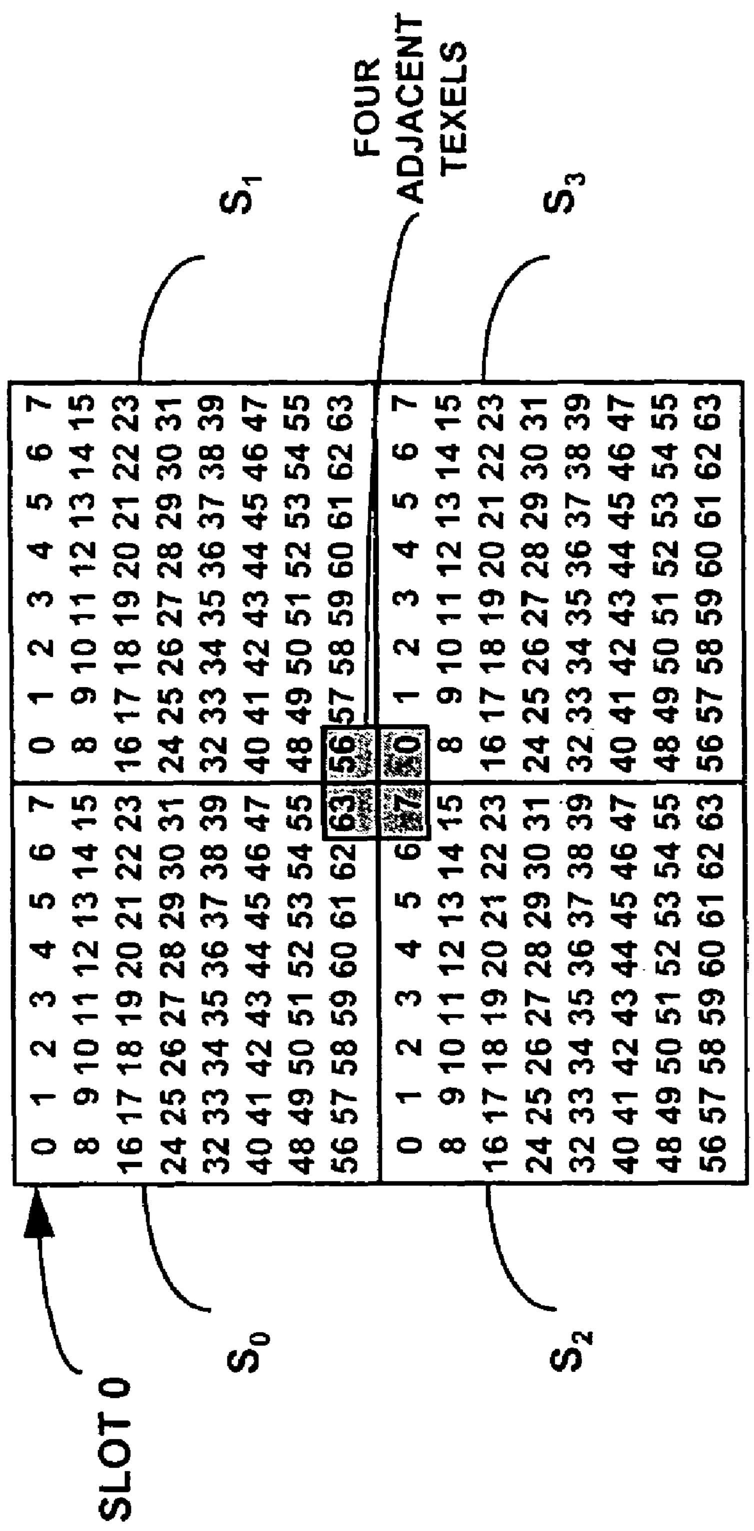
FIG. 8 illustrates details of four cache lines of the cache of FIG. 2.

For example, FIG. 8 shows an organization of four cache lines belonging to the Slot 0 of the cache in one embodiment of the present invention. Each cache line contains data for 64 texels covering an 8×8 contiguous portion of UV space. Together the four cache lines cover a 16×16 contiguous portion of UV space. A top left cache line belongs to set $S_0$. A top right cache line belongs to set $S_1$. A bottom left cache line belongs to set $S_2$. A bottom right cache line belongs to set $S_3$. Referring back to FIG. 7, it can be seen that, when four adjacent texture map portions are mapped to four adjacent cache lines, each texture map portion is mapped to a cache line belonging to a set different from each other. Therefore, FIG. 8 is representative of four cache lines where four adjacent texture map portions are mapped to.

Accordingly, the present invention provides for dynamic allocation of texture maps to a graphics cache. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

The invention claimed is:

1. A graphics processing method comprising:
partitioning a cache into a plurality of slots;
dynamically allocating each of the plurality of slots, wherein dynamically allocating each of the plurality of slots comprises:
determining texture maps needed to render a scene; and
allocating each of the plurality of slots of the cache to the texture maps, wherein allocating each of the plurality of slots of the cache to the texture maps comprises:
determining a number of available slots;
dividing the number of available slots by a number of texture maps;
allocating one slot to each texture map; and
allocating the remaining slots, wherein allocating the remaining slots comprises:
determining a largest texture map without additional slots; and
allocating one remaining slot to the largest texture map;
updating a register with a slot allocation status; and
rendering a scene utilizing the texture maps determined to be needed to render the scene.

2. A graphics processing method comprising:
partitioning a cache into a plurality of slots;
dynamically allocating each of the plurality of slots, wherein dynamically allocating each of the plurality of slots comprises:
determining texture maps needed to render a scene; and
allocating each of the plurality of slots of the cache to the texture maps, wherein allocating each of the plurality of slots of the cache to the texture maps comprises:
determining a number of available slots;
dividing the number of available slots by a number of texture maps;
allocating one slot to each texture map; and
allocating the remaining slots, wherein allocating the remaining slots comprises:
determining a texture map which is likely to be used most frequently to render the scene; and
allocating one remaining slot to the texture map which is likely to be used most frequently to render the scene;
updating a register with a slot allocation status; and
rendering a scene utilizing the texture maps determined to be needed to render the scene.

3. A method of dynamically allocating cache memory in a texture cache, comprising:
partitioning the cache into a plurality of slots;
determining a number of texture blocks to be rendered;
allocating each of the plurality of slots to a maximum of one of the texture blocks, wherein allocating each of the plurality of slots further comprises:
determining a largest texture map without additional slots; and
allocating one remaining slot to the largest texture map; and
rendering a scene utilizing the texture maps determined to be needed to render the scene.

4. A method of dynamically allocating cache memory in a texture cache, comprising:
partitioning the cache into a plurality of slots;
determining a number of texture blocks to be rendered;
allocating each of the plurality of slots to a maximum of one of the texture blocks, wherein allocating each of the plurality of slots further comprises:
determining a texture map which is likely to be used most frequently to render the scene; and
allocating one remaining slot to the texture map which is likely to be used most frequently to render the scene; and
rendering a scene utilizing the texture maps determined to be needed to render the scene.

* * * * *